(12) United States Patent
Akahane

(10) Patent No.: US 8,964,210 B2
(45) Date of Patent: Feb. 24, 2015

(54) IMAGE FORMING APPARATUS WHICH USES BOTH OF HDDS AND AN SDD, AND WHICH SAVES THE POWER CONSUMPTION

(71) Applicant: Konica Minolta, Inc., Tokyo (JP)

(72) Inventor: Tetsuya Akahane, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/245,422

(22) Filed: Apr. 4, 2014

(65) Prior Publication Data

US 2014/0300919 A1    Oct. 9, 2014

(30) Foreign Application Priority Data

Apr. 8, 2013    (JP) ................. 2013-080553

(51) Int. Cl.
```
G06F 3/12      (2006.01)
G06K 15/00     (2006.01)
H04N 1/40      (2006.01)
```
(52) U.S. Cl.
CPC ................. *G06K 15/4055* (2013.01)
USPC ......... 358/1.14; 358/1.1; 358/1.13; 358/1.16; 358/3.24

(58) Field of Classification Search
USPC .............. 358/1.14, 1.13, 1.1, 404, 1.16, 3.24; 713/323, 320, 340, 330, 310, 321; 711/100, 102, 4, 5, 101, 104, 147, 148
See application file for complete search history.

(56) References Cited

U.S. PATENT DOCUMENTS

2012/0008165 A1*  1/2012  Tanaka .................. 358/1.15
2013/0227325 A1*  8/2013  Konosu ................. 713/323

FOREIGN PATENT DOCUMENTS

| JP | 2009-271637 A | 11/2009 |
| JP | 2010-124076 A | 6/2010 |

* cited by examiner

*Primary Examiner* — Ngon Nguyen
(74) *Attorney, Agent, or Firm* — Lucas & Mercanti, LLP

(57) ABSTRACT

Disclosed is an image forming apparatus, including: a first storing device; a second storing device in which consumed power is low as compared with the first storing device; and a control unit configured to start up the image forming apparatus by a program stored in the second storing device, and to execute the job by using one of the storing devices as a storing area for the image data, wherein the control unit controls the image forming apparatus in a first operation mode in which the image forming apparatus is started up without supplying electric power to the first storing device, and in which when a predetermined condition is satisfied, the job is executed by using the second storing device and when the predetermined condition is not satisfied, the job is executed by supplying the electric power to the first storing device and using the first storing device.

8 Claims, 6 Drawing Sheets

IMAGE FORMING APPARATUS WHICH USES BOTH OF HDDS AND AN SDD, AND WHICH SAVES THE POWER CONSUMPTION

CROSS REFERENCE TO RELATED APPLICATION

This Application claims the benefit of priority of Japanese Patent Application No. 2013-080553 filed on Apr. 8, 2013, which application is incorporated herein by reference in its entirety.

BACKGROUND OF THE INVENTION

1. Field of the Invention

The present invention relates to an image forming apparatus which uses both of HDDs and an SSD, and which saves the power consumption.

2. Description of Related Art

In the international energy conservation program "International Energy Star Program", an applicant is allowed to use the logo (mark) of the Program on a product which satisfies the specified energy conservation standard. The logo (in which the star mark and the term "ENERGY STAR" are drawn) can be used and indicated on the above product.

In the International Energy Star Program, at the time of the inauguration of the Program, in case of the energy conservation standard for a printer and a multi-function peripheral, only the standby energy is specified. Therefore, it was technically easy to satisfy the standard (obtain the qualification). However, in 2007, the standard was revised so as to judge the qualification by measuring the power consumption under the nearly actual use condition. As a result, the entire energy conservation including the energy conservation in the operating state of the printer is regained. In the new standard, the power consumption is measured by using the TEC (Typical Electricity Consumption) method for calculating the TEC value. Then, in the standard revised in 2013, by deciding the stricter standard, it is required to improve the performance relating to the energy conservation in both of the operating state and the standby state of the printer in order to satisfy the standard.

In an image forming apparatus, as a method for writing and reading the data at high speed, it is widely known that the RAID (Redundant Arrays of Inexpensive Disks) 0 (the RAID in level 0, hereinafter, referred to as "striping") in which a plurality of HDDs (Hard Disk Drives) are activated in parallel and the data is dispersedly stored in the HDDs, is adopted. However, in the device having a large number of HDDs, a large amount of electricity is required.

The above problem can be solved by using one SDD (Solid State Drive) instead of a plurality of HDDs. The SDD is a storing device in which data can be written and read alone at high speed and in which the consumed power is lower as compared with the HDD.

However, the SDD has the upper limit on the number of times of rewriting data. Therefore, in case that only the SDD is used as the storing device, when the number of times of rewriting data reaches the upper limit, the data cannot be rewritten until the SDD is exchanged for a new one. As a result, the problem in which an image forming apparatus cannot be used, is caused. Further, in the SDD, the cost per unit capacity is high as compared with the HDD. Therefore, in consideration of the cost, the durability and the transfer speed of the storing device, it is preferable to use the SSD in combination with the HDDs.

For example, as the method for using the SDD in combination with the HDDs, in Japanese Patent Application Publication No. 2009-271637, the following method is disclosed. In the method, it is judged whether each storing device is the HDD or the SDD in the apparatus comprising a plurality of storing devices (HDDs and SDDs). The HDDs are activated in order (because a large amount of electricity is required at the spin-up in the HDDs). By activating the SDDs in parallel, the peak power consumption is suppressed.

In Japanese Patent Application Publication No. 2010-124076, the following method is disclosed. In the method, in the image processing apparatus comprising two storing devices which are different from each other in the time period necessary to enable the image to be read, the data to be read at the starting up of the apparatus is dispersedly stored in the above two storing devices. When the apparatus is started up, the data is read in order from the device in which the time period necessary to enable the image to be read is shorter. As a result, the time necessary to read the data at the starting up of the apparatus is shortened.

The method disclosed in Japanese Patent Application Publication No. 2010-124076, is the method for shortening the time necessary to read the data at the starting up of the apparatus. However, by the above method, the power consumption is not saved.

In the method disclosed in Japanese Patent Application Publication No. 2009-271537, it is possible to suppress the peak power consumption. However, by the above method, the power consumption which is caused in the operating state after the power supply is switched on is not saved.

SUMMARY

To achieve at least one of the abovementioned objects, an image forming apparatus reflecting one aspect of the present invention comprises:

an image forming unit configured to form an image in accordance with image data;

a first storing device;

a second storing device in which consumed power is low as compared with the first storing device;

an obtaining unit configured to obtain a job; and a control unit configured to start up the image forming apparatus by executing a program stored in the second storing device, to control an execution of the job obtained by the obtaining unit, which is carried out by using the first storing device or the second storing device as a storing area for the image data, and to control a power supply to each unit of the image forming apparatus, wherein the control unit controls the image forming apparatus in a first operation mode in which the image forming apparatus is started up without supplying electric power to the first storing device, and in which in case that a predetermined condition is satisfied, the job is executed by using the second storing device and in case that the predetermined condition is not satisfied, the job is executed by supplying the electric power to the first storing device and by using the first storing device.

Preferably, the predetermined condition is that the obtained job is Nth or prior job after the image forming apparatus is started up, N being an integer which is 1 or more.

Preferably, the obtaining unit obtains information indicating data size of the job, and the predetermined condition is that the data size which is indicated by the obtained information is less than a predetermined value.

Preferably, the predetermined condition is that power consumption in whole of the image forming apparatus, which is caused when the job is executed by using the first storing device, is not less than a threshold value.

Preferably, the predetermined condition is that a free space of the second storing device is not less than a predetermined amount.

Preferably, the control unit controls the image forming apparatus in the first operation mode or in a second operation mode in which the electric power is supplied to the first storing device when the image forming apparatus is started up.

Preferably, the image forming apparatus is initially set so as to operate in the first operation mode.

Preferably, the first storing device is HDDs, and the second storing device is an SSD.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will foe explained with reference to the accompanying drawings.

Figure 1:
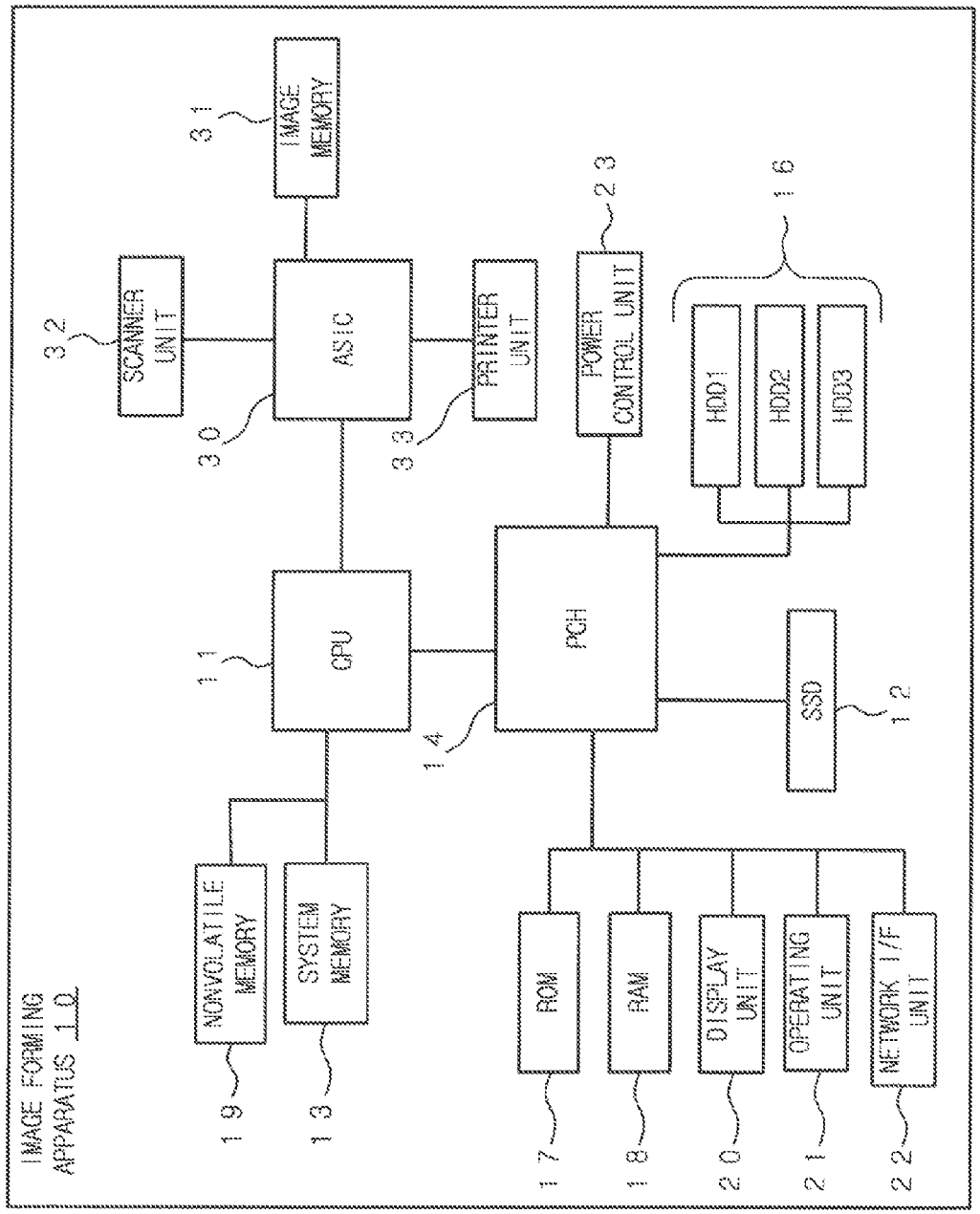
FIG. 1 is a view showing the schematic configuration of the image forming apparatus according to the embodiment.

FIG. 1 shows the schematic configuration of the image forming apparatus 10 according to the embodiment. The image forming apparatus is a so-called multi-function peripheral having the function of executing jobs, such as a copy job for printing an image on recording paper by optically reading an original, a scan job for obtaining image data by reading an original to store the image data as a file or to transmit the image data to an external terminal, a print job for printing out an image on the recording paper in accordance with the data received from an external device (or the data stored in the image forming apparatus 10), and the like.

In this embodiment, each job to be executed by the image forming apparatus 10 includes at least any one of the process for storing (writing) the image data and the process for reading the image data. Further, in the image forming apparatus 10, a storage unit 16 and an SSD 12 which will be described later are selectively used as the storing area (writing area or reading area) for the image data.

The image forming apparatus 10 comprises a CPU (Central Processing Unit) 11 for controlling the operation of the image forming apparatus 10, an SSD 12, a system memory 13, a PCH (Platform Controller Hub) 14, a ROM (Read Only Memory) 17, a RAM (Random Access Memory) 18, a nonvolatile memory 19, a display unit 20, an operating unit 21, a network I/F (interface) unit 22, a storage unit (HDDs 1 to 3) 16, a power control unit 23, an ASIC (Application Specific Integrated Circuit) 30, a scanner unit 32, an image memory 31 and a printer unit 33.

By the CPU 11, a middleware, application programs, and the like are executed on an OS (Operating System) program as a base.

The PHC 14 is connected with the CPU 11, the ROM 17, the RAM 13, the display unit 20, the operating unit 21, the network I/F unit 22, the SSD 12, the storage unit 16 (HDDs 1 to 3) and the power control unit 23, respectively by using independent signal lines. Further, the PHC 14 includes a memory controller for controlling the access to the system memory 13, a cache controller for controlling the access to the cache memory which is not shown in the drawings, an HDD controller for controlling the writing and reading the data in/from a plurality of HDDs in the storage unit 16, an operation panel controller for controlling the operation of the display unit 20 and the operation of the operating unit 21, and the like. The PCH 14 intervenes between the units connected with the PCH 14, and carries out the reception and the transmission of the data. For example, the CPU 11 accesses to the ROM 17, the RAM 18 and the like via the PCH 14.

The system memory 13 is used for temporarily storing various data when the CPU 11 executes the programs. In this embodiment, the system memory 13 temporarily stores the data which is written in the storing unit 16 by the HDD controller contained in the PCH 14 and the data which is read from the storage unit 16.

In the ROM 17, the boot program is stored. After the boot, the programs stored in the SDD 12 which will foe described later are executed. By carrying out the process by the CPU 11 in accordance with the programs stored in the SDD 12, each function of the image forming apparatus 10, such as the execution of the job, is realized. The RAM 18 is used as a work memory for temporarily storing various data when the CPU 11 executes the programs.

The nonvolatile memory 19 is a rewritable memory (flash memory) in which the stored data is held even if the image forming apparatus 10 is turned off. In the nonvolatile memory 19, the information unique to the image forming apparatus 10, various types of setting information, and the like are stored. In the nonvolatile memory 19, the setting relating to whether the image forming apparatus 10 is started up in accordance with the first operation mode or the second operation mode, which will be described below, is stored. The CPU 11 outputs the instruction relating to the power supply to the storage unit 16 at the starting up of the image forming apparatus 10 in accordance with the stored setting, to the power control unit 23. When the image forming apparatus 10 is shipped from a factory, the setting for starting up the image forming apparatus 10 in accordance with the first operation mode is registered in the nonvolatile memory 19.

The SSD 12 is a rewritable memory (flash memory) in which the stored contents are held even if the image forming apparatus 10 is turned off. The SSD 12 has the upper limit on the number of times of rewriting data. When the number of times of rewriting data reaches the upper limit, the data cannot be rewritten in the SSD 12. In the SSD 12, in addition to the program for controlling the operation of the image forming apparatus 10 (for the system control), the image data used in the job (RAM image or RIP (Raster Image Processor) image) are stored. The program to be executed is stored in the system memory 13 by transferring the program from the SSD 12 to the system memory 13 as necessary. The CPU 11 executes the program by reading out the program stored in the system memory 13.

The storage unit 16 comprises a plurality of HDDs which are large-capacity nonvolatile memories. In the HDD, the image data used in the job (RAW image or RIP image), the job history and the like are stored. In this embodiment, the storage unit 16 comprises three HDDs (HDD1, HDD2 and HDD3), and stores the image data by the RAID0 using three HDDs (striping).

In the striping, the data is dispersedly written in or read from a plurality of HDDs. By carrying out the striping, the data transfer speed is increased in the whole RAID0 as compared with the case in which the data is transferred by using one HDD. In order for the image forming apparatus 10 to satisfy the productivity, that is, in order to carry out the printing at the highest printing speed on the specification of the image forming apparatus 10, it is necessary to keep the transfer speed at which the image data is transferred to the HDDs, or the data transfer speed at which the image data is read from the HDDs and is transferred to the printer unit 33, to the specified speed or more without causing the printing queue in the printer unit 33. By carrying out the striping, the transfer speed is kept to the above specified speed or more.

The data can be written in or read from the SSD 12 at the data transfer speed which is equivalent to or higher than the data transfer speed in the whole RAID0 in case that the striping is carried out. In the SSD 12, the consumed power is low as compared with the storage unit 16. In case that the job is executed by using the SSD 12 as the storing area for the image data, the power consumption is reduced as compared with the case in which the job is executed by using the storage unit 16 as the storing area for the image data.

The display unit 20 comprises a liquid crystal display (LCD) or the like, and has the function of displaying various types of operation windows, setting windows and the like. The operating unit 21 has the function of receiving various types of operations, such as the input and the setting of the job, and the like. The operating unit 21 comprises a touch panel which is provided on the screen of the display unit 20 and which detects the coordinate position on which the screen is pushed down. Further, the operating unit 21 comprises a numerical keypad, character entry keys, a start button for starting the printing, a power button and the like. When the power button is pushed down, the image forming apparatus 10 is turned on/off. For example, when the power button is pushed down in the power off state, the image forming apparatus 10 changes to the power on state (the image forming apparatus 10 is started up).

The network I/F unit 22 communicates with an external device or the like, connected via the network, such as a LAN (Local Area Network) or the like. For example, the network I/F unit 22 receives the print job from an external device.

The ASIC 30 is connected with the scanner unit 32, the image memory 31, the printer unit 33 and the CPU 11. The ASIC 30 is an integrated circuit for carrying out various types of conversion processings, image processings relating to the scan function (image reading) and the print function (image printing). The ASIC 30 comprises a conversion unit for converting an analog image signal input from the scanner unit 32 into digital image data; a transfer unit for transferring the digital image data obtained by converting the analog image signal to the system memory 13 and the like; an image processing unit for carrying out the rasterizing process for converting print data into image data, the compression/decompression process for the image data, and the like in addition to the processing, such as the enlargement/reduction or the rotation of image data; an output control unit for outputting the image data to the printer unit 33 in synchronization with the operating timing of the printer unit 33 when the printing is carried out, and the like.

The scanner unit 32 has the function of obtaining the image data by optically reading an original (this operation is referred to simply as "scan"). The scanner unit 32 comprises for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, and the like. The scanner unit 32 outputs the image signal obtained by optically reading the original to the ASIC 30.

The image memory 31 is a memory allocated specially for the image processing. The ASIC 30 controls the reading/writing of the data from/in the image memory 31.

The printer unit 33 has the function of forming an image on the recording paper in accordance with the image data. In this embodiment, the printer unit 33 is configured as a so-called laser printer (printer engine) comprising a conveying device for the recording paper, a photoconductive drum, a charging device, a laser unit, a developing device, a transfer and separation device, a cleaning device, a fixing device, and the like. The laser printer forms an image by the electrophotographic process. An image may be formed by another process, such as the inkjet process.

The power control unit 23 controls the power supply to each unit of the image forming apparatus 10. In this embodiment, the power control unit 23 controls the power supply to the storage unit 16, the scanner unit 32 and the printer unit 33 in accordance with the instruction of the CPU 11.

The image forming apparatus 10 has two operation modes which are the first operation mode and the second operation mode. In the first operation mode, the image forming apparatus 10 is started up without supplying the electric power to the storage unit 16. In case that the predetermined conditions are satisfied, the image forming apparatus 10 executes the job by using the SSD 12 as the storing area for the image data. In case that the predetermined conditions are not satisfied, the image forming apparatus 10 supplies the electric power to the storage unit 16 and executes the job by using the storage unit 16 as the storing area for the image data. In the second operation mode, when the image forming apparatus 10 is started up, the image forming apparatus 10 supplies the electric power to she storage unit 16 and executes the job by preferentially using the storage unit 16 as the storing area for the image data. The predetermined conditions will be explained later.

The setting relating to whether the image forming apparatus 10 is started up in accordance with the first operation mode or the second operation mode, is received from a user via the operating unit 21 or the like. The set operation mode is stored in the nonvolatile memory 19. At the next starting up of the image forming apparatus 10, the image forming apparatus 10 is started up in accordance with the operation mode stored in the nonvolatile memory 19. When the switching between the first operation mode and the second operation mode is carried out, the image forming apparatus 10 may be automatically restarted up.

The job is executed by using the storage unit 16 (HDDs 1 to 3) as the storing area for the image data, in case that that the job is executed in accordance with the second operation mode or in case that the predetermined conditions are not satisfied after the image forming apparatus 10 is started up in accordance with the first operation mode. In these cases, the image forming apparatus 10 supplies the electric power to both the storage unit 16 and the SSD 12.

The job is executed by using the SSD 12 as the storing area for the image data, in case that the predetermined conditions are satisfied after the image forming apparatus 10 is started up in accordance with the first operation mode. In this case, the image forming apparatus 10 does not supply the electric power to the storage unit 16 (HDDs 1 to 3). Therefore, in this case, the power consumption can be suppressed as compared with the case in which the job is executed by using the storage unit 16 (HDDs 1 to 3) as the storing area for the image data.

Next, the case in which the image forming apparatus 10 executes the job by using the storage unit 16 (HDDs 1 to 3) as the storing area for the image data, and the case in which the image forming apparatus 10 executes the job by using the SSP 12 as the storing area for the image data, will be explained by using the specific examples.

FIG, 2 shows the data flow in case that she copy job is executed by using the storage unit 16 (HDDs 1 to 3) as the storing area for the image data. In the copy job of FIG. 2, the writing process for writing the image data obtained by reading an original at the scanner unit 32 in the storage unit 16 and the reading process for reading the image data stored in the storage unit 16 to print out the image, are carried out in parallel. In the drawing, the data flow in the writing process is indicated by the dashed lines, and the data flow in the reading process is indicated by the solid lines.

Firstly, the scanner unit 32 reads the image. The image data obtained by reading the image is sequentially output from the scanner unit 32 to the ASIC 30. The ASIC 30 sequentially stores the image data input from the scanner unit 32, in the image memory 31. Then, the ASIC 30 reads the image data from the image memory 31 and carries out the DMA (Direct Memory Access) transfer of the image data to the system memory 13. In this drawing, the situation in which the image data is stored in the image memory 31 is not shown.

Next, the HDD controller of the PCH 14 reads the image data stored in the system memory 13 and divides the read image data into a plurality of division data. Then, each division data is dispersedly stored in the HDD1, the HDD2 and the HDD3 by using the RAID0 (striping). Each division data is stored in the state of the RAW image. The above-described steps are carried out in the writing process for writing the image data obtained by reading the original at the scanner unit 32 in the storage unit 15. Next, the reading process for reading the image data stored in the storage unit 16 to print out the image, will be explained.

Firstly, the CPU 11 transfers the division data read from the storage unit 16 (HDDs 1 to 3) to the system memory 13, and restores the original image data by combining the division data on the system memory 13.

Next, the ASIC 30 carries cut the DMA transfer of the restored image data to the image memory 31 by reading the restored image data from the system memory 13 in accordance with the output instruction from the CPU 11.

Then, in case that the instruction for carrying out the black-and-white printing is included in the contents of the print job for printing out the image data, the ASIC 30 carries out the black-and-white conversion for the image data.

After the ASIC 30 carries out the image processing, such as the rotation, the trimming or the like of the image data, the ASIC 30 transmits the data obtained by the above image processing to the printer unit 33. The printer unit 33 prints out the image in accordance with the received image data. The above-described steps are carried out in the process for executing the copy job by using the storage unit 15 (HDDs 1 to 3) as the storing area for the image data.

In the above copy job, the image forming apparatus 10 prints out the image by reading the RAW image stored in the storage unit 16. On the other hand, in case that the image is printed out in accordance with print data having the PDL (Page Description Language) format, which is received from an external device (in case that a print job is executed), the CPU 11 carries out the RIP process for the print data. Further, the CPU 11 stores (temporarily stores) the rip image obtained by the RIP process, in the HDDs 1 to 3 by carrying out the striping for the RIP image (dividing the RIP image). Then, the rip image stored by the striping is transferred to the printer unit 33 by the same method as the above-described reading process in the execution of the copy job, and the image is printed out in accordance with the RIP image.

Figure 3:
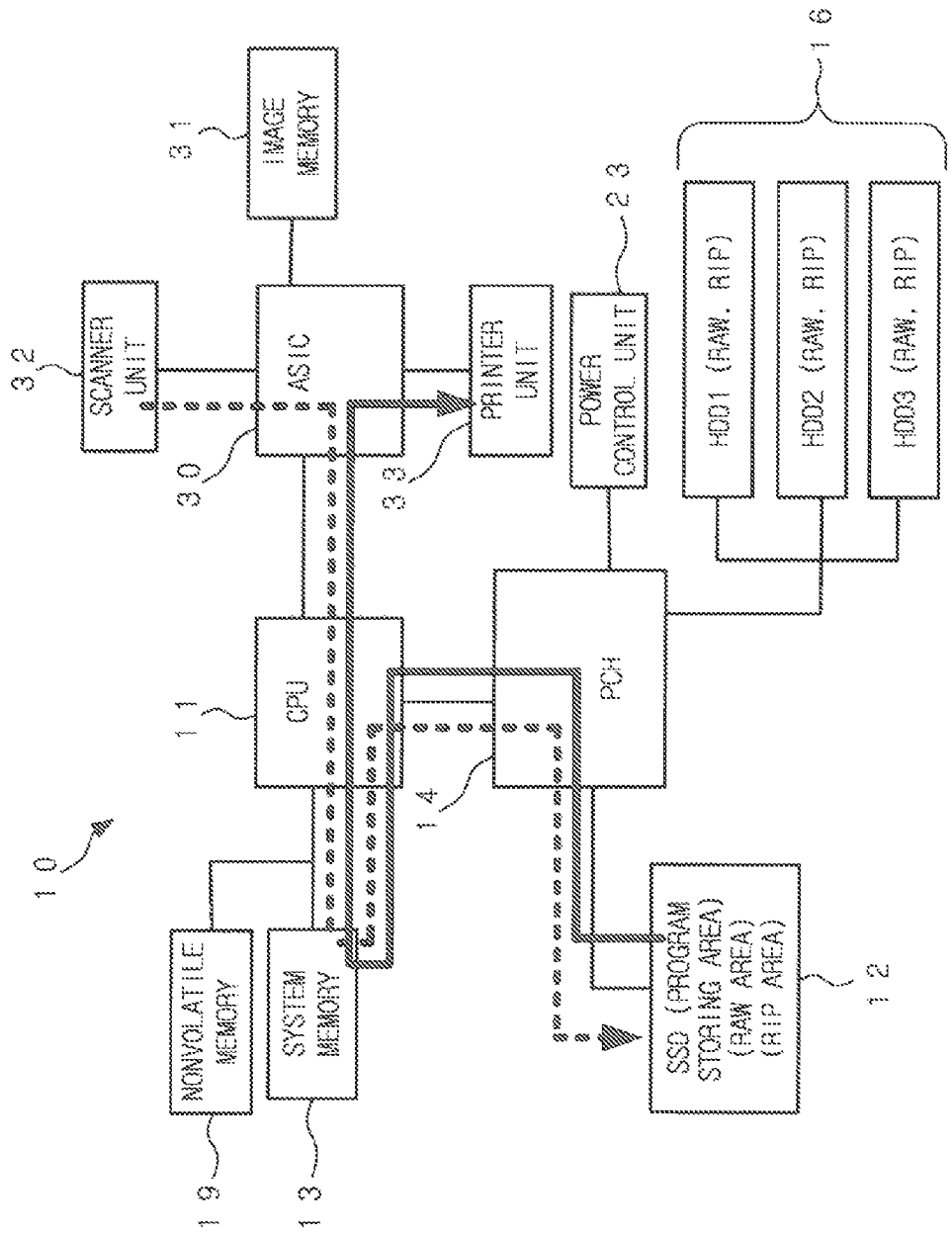
FIG. 3 is a view showing the data flow in case that the read image is stored in the SDD and is printed.

FIG. 3 shows the data flow in case that the copy job is executed by using the SSD 12 as the storing area for the image data. In the copy job of FIG. 3, the writing process for writing the image data obtained by reading an original at the scanner unit 32 in the SSD 12 and the reading process for reading the image data stored in the SSD 12 to print out the image, are carried out in parallel. In the drawing, the data flow in the writing process is indicated by the dashed lines, and the data flow in the reading process is indicated by the solid lines.

Firstly, the scanner unit 32 reads the image. The image data obtained by reading the image is sequentially output from the scanner unit 32 to the ASIC 30. The ASIC 30 sequentially stores the image data input from the scanner unit 32, in the image memory 31. Then, the ASIC 30 reads the image data from the image memory 31 and carries out the DMA transfer of the image data to the system memory 13. In this drawing, the situation in which the image data is stored in the image memory 31 is not shown.

Next, the HDD controller of the PCH 14 reads the image data stored in the system memory 13 and stores the read image data in the SSD 12. The image data is stored in the state of the RAW image. The above-described steps are carried out in the writing process for writing the image data obtained by reading the original at the scanner unit 32 in the SSD 12.

Next, the reading process for reading the image data stored in the SSD 12 to print out the image, will be explained.

Firstly, the CPU 11 transfers the image data read from the SSD 12 to the system memory 13. The ASIC 30 carries oat the DMA transfer of the image data to the image memory 31 by reading the image data from the system memory 13 in accordance with the output instruction from the CPU 11.

Then, in case that the instruction for carrying out the black-and-white printing is included in the contents of the print job for printing out the image data, the ASIC 30 carries out the black-and-white conversion for the image data.

After the ASIC 30 carries out the image processing, such as the rotation, the trimming or the like of the image data, the ASIC 30 transmits the data obtained by the above image processing to the printer unit 33. The printer unit 33 prints out the image in accordance with the received image data. The above-described steps are carried out in the process for executing the copy job by using the SSD 12 as the storing area for the image data.

In the above copy job, the image forming apparatus 10 prints out the image by reading the RAW image stored in the SSD 12. On the other hand, in case that the image is printed out in accordance with print data having the PDL format, which is received from an external device (in case that a print job is executed), the CPU 11 carries out the RIP process for the print data. Further, the CPU 11 stores (temporarily stores)

the RIP image obtained by the RIP process, in the SSD 12. Then, the RIP image stored in the SSD 12 is transferred to the printer unit 33 by the same method as the above-described reading process in the execution of the copy job, and the linage is printed out in accordance with the RIP image.

Figure 2:
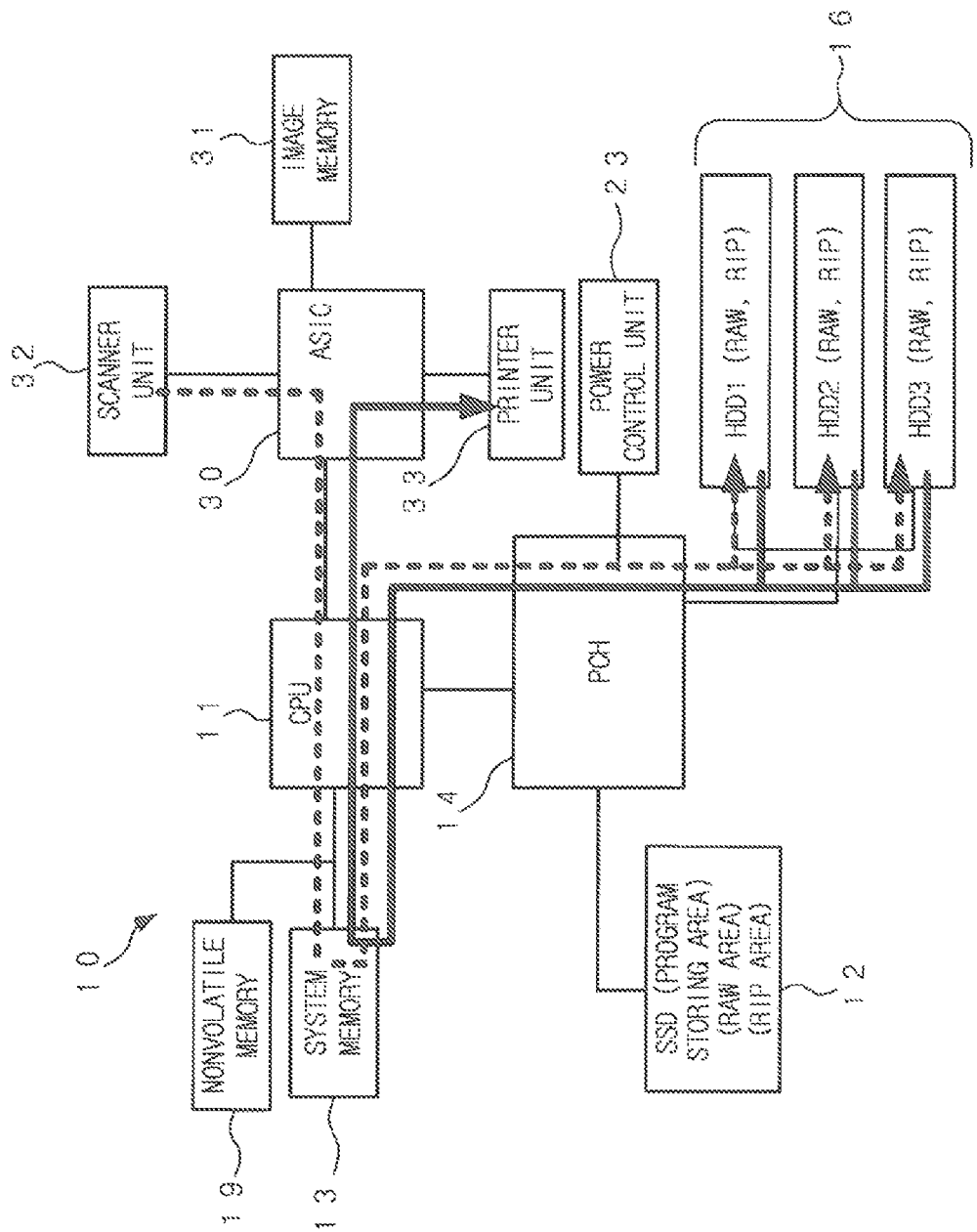
FIG. 2 is a view showing the data flow in case that the read image is stored in the HDDs and is printed.
Figure 4:
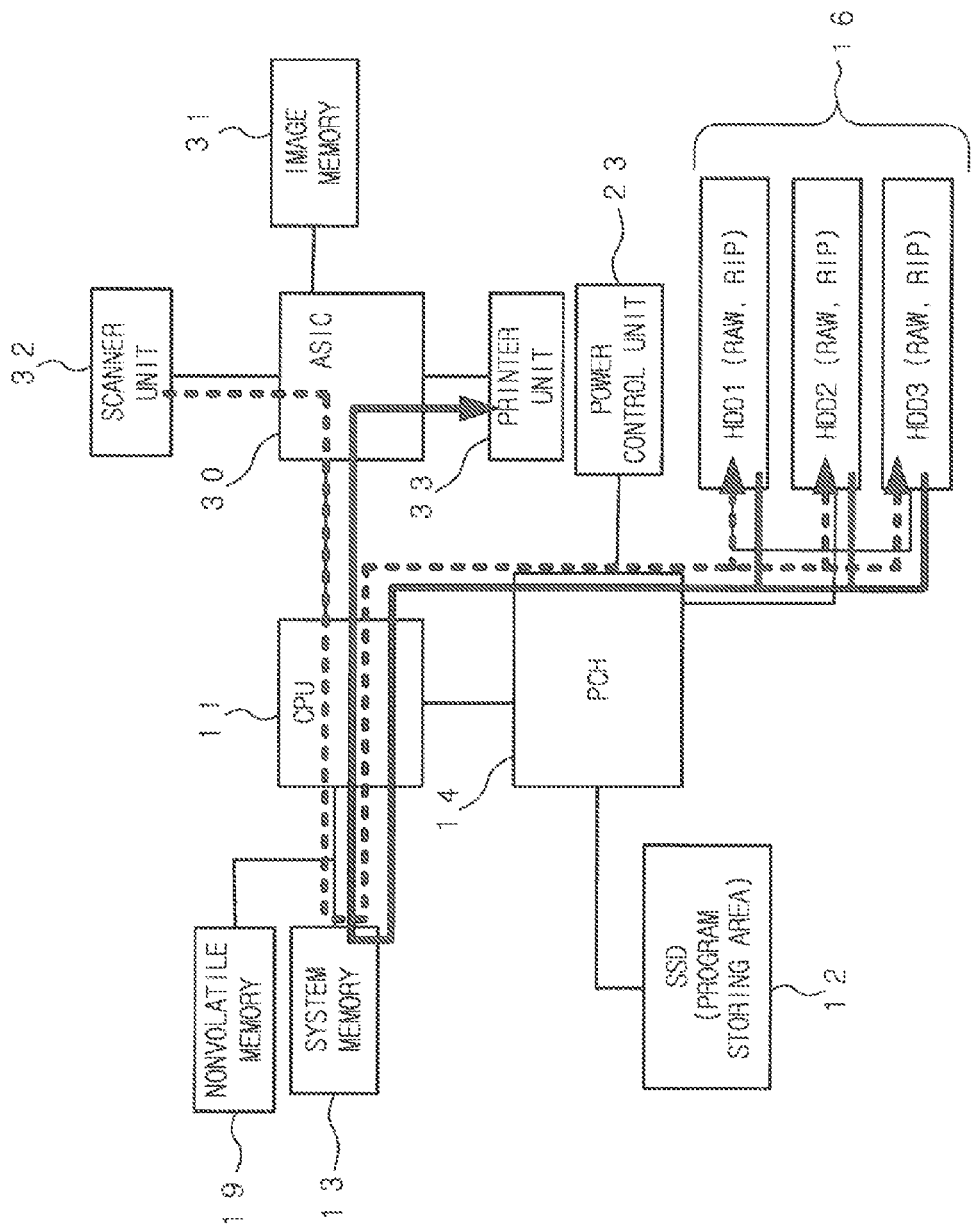
FIG. 4 is a view snowing the types of data stored in the HDDs and the SDD in a conventional apparatus.

In the image forming apparatus 10 according to the embodiment, in addition to the programs for controlling the operation of the image forming apparatus, the image data used in the job (RAW image or RIP image) are also stored in the SSD 12 (See FIG. 2 and FIG. 3). For example, as shown in FIG. 4, in case that the SSD 12 is used only as the storing area for the programs for controlling the operation of the image forming apparatus 10 and the storing area for the image data is limited to the storage unit 15 (HDDs 1 to 3), in order to use the storage unit 16 as the storing area for the image data, it is required to supply the electric power to the storage unit 16 every when the job is executed. However, because the image forming apparatus 10 according to the embodiment, is started up by executing the program stored in the SSD 12 and uses the SSD 12 as the storing area tor the image data used in the job after the starting up of the image forming apparatus 10, it is possible to execute the job without supplying the electric power to the storage unit 16. Therefore, in all of the operations from the starting up of the image forming apparatus 10 until the execution of the job, the power consumption can be saved.

In the image forming apparatus 10, the programs for the system control (including the startup program) are stored in the SSD 12. At the starting up of the image forming apparatus 10, the image forming apparatus 10 reads the above programs by supplying the electric power to the SSD 12 and operates In accordance with the read programs. In case that the programs for the system, control are stored in the storage unit 16, it is required to supply the electric power to the storage unit 16 at the starting up of the image forming apparatus 10. On the other hand, the image forming apparatus 10 according to the embodiment can be started up and can be set to the state in which the job can be executed, without supplying the electric power to the storage unit 16. Therefore, the power consumption can be saved.

Figure 5:
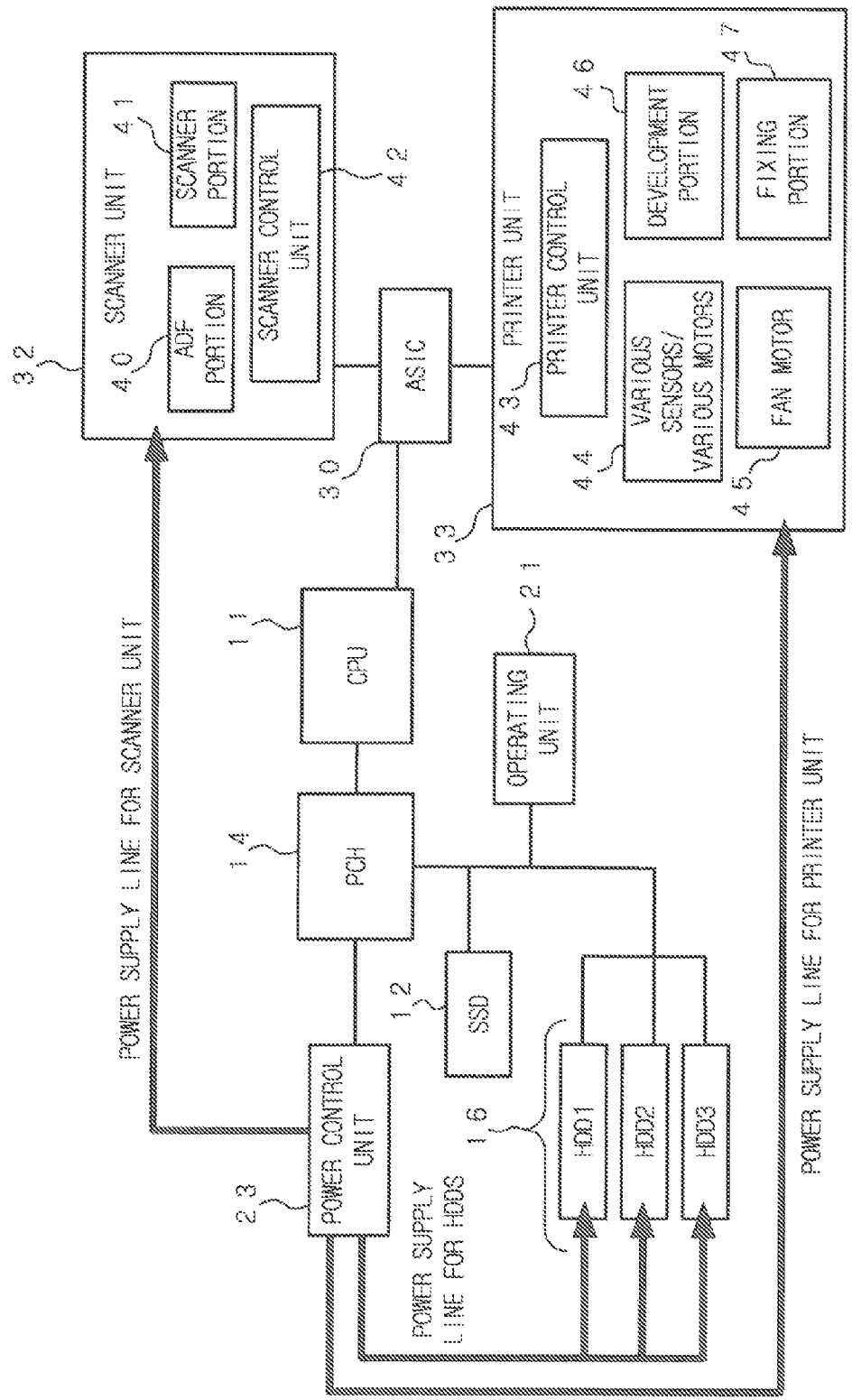
FIG. 5 is a view showing the situation in which the power control unit controls the power supply to the scanner unit, the HDDs and the printer unit.

FIG. 5 shows the situation in which the power control unit 23 supplies the electric power to the scanner unit 32, the storage unit 16 and the printer unit 33. The power control unit 23 is connected with the scanner unit 32, the storage unit 16 and the printer unit 33, respectively by using independent lines for supplying the electric power. The electric power is supplied to each unit via each line.

The electric power is supplied to the scanner unit 32 via the power supply line for the scanner unit. The electric power is supplied to each portion of the scanner unit 32 by the scanner control unit 42. The scanner control unit 42 controls the power supply to the ADF (Auto Document Feeder) portion 40 which is the portion for conveying an original, the scanner portion 41 for optically reading an original, and the like.

The electric power is supplied to the printer unit 33 via the power supply line for the printer unit. The electric power is supplied to each portion of the printer unit 33 by the printer control unit 43. The printer control unit 43 controls the power supply to various sensors/various motors 44 used for feeding the paper, the development (transfer) portion 46 comprising a charging device, a photoconductive drum and the like, the fixing portion 47 for fixing the toner on the recording paper by heating and melting the toner, the fan motor 45 for relieving the heat from the printer unit 33.

The electric power is supplied to the storage unit 16 via the power supply line for the HDDs. In case that the image forming apparatus 10 is started up in accordance with the second operation mode, or in case that the predetermined conditions are not satisfied after the image forming apparatus 10 is started up in accordance with the first operation mode, the power supply is started.

Next, the process which is carried out after the image forming apparatus 10 is started up, will be explained, when the image forming apparatus 10 is started up, that is, when the power off state is changed to the power on state, each unit of the image forming apparatus 10 carries out the starting operation (warm-up) so as to be in the state in which the job can foe executed. For example, the starting operation includes the initialization of each unit, the warming up of the fixing portion 47 (See FIG. 5) in which the temperature is increased to a specified value, and the like.

Next, the predetermined conditions will be explained. As the predetermined conditions, the following conditions 1 to 4 are determined.

<Condition 1: The Number of Times of the Execution of the Jobs after the Starting Up of the Image Forming Apparatus>

The Condition 1 is that the job to be executed is the Nth (N is an integer which is 1 or more) or prior job after the starting up. The image forming apparatus 10 executes the Nth (N is an integer which is 1 or more) or prior job after the starting up, by using the SSD 12 as the storing area for the image data. On the other hand, the image forming apparatus 10 executes the (N+1)th or subsequent job by supplying the electric power to the storage unit 16 and using the storage unit 16 as the storing area for the image data. The value N may be set by a user or be a fixed value. The value N may be set to a suitable value.

The CPU 11 counts the number of times of the execution of the jobs after the finish of the starting operation. That is, the CPU 11 resets the counter for counting the number of times of the execution of the jobs, to 0 at the starting up of the image forming apparatus 10, and then counts up the counter every when the job is executed.

In the Condition 1, the CPU 11 executes the Nth or prior job by using the SSD 12 as the storing area for the image data after the starting up of the image forming apparatus 10 without supplying the electric power to the storage unit 16. Then, the CPU 11 executes the (N+1)th or subsequent job by supplying the electric power to the storage unit 16 and using the storage unit 16 as the storing area for the image data. From the starting up until the Nth job execution, it is not required to supply the electric power to the storage unit 16. Therefore, it is possible to save the power consumption. For example, in case that the job execution is carried out N times or less after the starting up from the sleep state and the image forming apparatus 10 returns to the sleep state again, it is not at all required to use the storage unit 16.

<Condition 2: The Data Size of the Job>

The Condition 2 is that the data size of the job is less than the predetermined value. When the image forming apparatus 10 receives the job, the CPU 11 checks the data size of the received job. For example, by obtaining the number of pages in the image data and by multiplying the data size for one page by the number of pages, the data size of the job is calculated. After the image forming apparatus 10 is started up without supplying the electric power to the storage unit 16, in case that the data size of the job is less than the predetermined value, the CPU 11 executes the job by using the SSD 12 as the storing area without supplying the electric power to the storage unit 16. In case that the data size of the job is not less than the predetermined value, the storage unit 16 is powered on when the job is executed. Then, the CPU 11 executes the job by using the storage unit 16 as the storing area for the image data. The predetermined value may be set by a user or be a fixed value.

After the image forming apparatus 10 is started up without supplying the electric power to the storage unit 16, in case that the data size is less than the predetermined value, the CPU 11 uses the SSD 12. Therefore, it is possible to save the power consumption. Further, in case that the data size of the job is not less than the predetermined value, the storage unit 16 is used as the storing area for the image data. Therefore, it is possible to reduce the capacity of the SSD 12, and to prevent the increase in the number of times of rewriting data in the SSD 12. Further, because in the HDD, the bit unit price is cheap as compared with the SSD 12, the HDD is suitable for storing the image data of the job having the large data size.

<Condition 3: The Free Space of the SDD 12>

The Condition 3 is that the free area (free space) of the SSD 12 is not less than the predetermined amount. Before the job is executed, the CPU 11 checks the free space of the SSD 12. After the image forming apparatus 10 is started up without supplying the electric power to the storage unit 16, in case that the free space of the SSD 12 is not less than the predetermined amount, the CPU 11 executes the job by using the SSD 12 as the storing area for the image data. In case that the free space of the SSD 12 is less than the predetermined amount, the storage unit 16 is powered on when the job is executed. Then, the CPU 11 executes the job by using the storage unit 16 as the storing area for the image data. The predetermined amount may be set by a user or be a fixed value.

After the image forming apparatus 10 is started up without supplying the electric power to the storage unit 16, in case that the free space of the SSD 12 is decreased, the CPU 11 powers on the storage unit 16 and executes the job by using the storage unit 16 as the storing area for the image data. Therefore, even though the free space of the SSD 12 is decreased, it is possible to process the job having the large data size. For example, the free space of the SSD 12 is compared with the storage capacity which is necessary to execute the job. In case that the free space of the SSD 12 is not sufficient to execute the job, the electric power is supplied to the storage unit 16 and the job is executed by using the storage unit 16 as the storing area for the image data.

<Condition 4: The Power Consumption in the Whole Image Forming Apparatus 10>

The Condition 4 is that the power consumption in the whole image forming apparatus 10 is not less than the threshold value in case that the job is executed by using the storage unit 16. After the image footing apparatus 10 is started up without supplying the electric power to the storage unit 16, the CPU 11 estimates the amount of electric power to be consumed in the whole image forming apparatus 10 in case that the job is executed by using the storage unit 16 as the storing area for the image data, before the execution of the job. In case that the estimated amount of electric power is not less than the threshold value, the CPU 11 executes the job by using the SSD 12 as the storing area for the image data. In case that the estimated amount of electric power is less than the threshold value, the storage unit 16 is powered on. Then, the CPU 11 executes the job by using the storage unit 16 as the storing area for the image data. The threshold value may be set by a user or be a fixed value.

The amount of electric power to be consumed during the job execution is varied according to the type of job, the contents of the job, the contents of the setting of the image forming apparatus 10, and the like. For example, in case that the copy job is executed, the electric power is supplied to both the scanner unit 32 and the printer unit 33. On the other hand, in cases that the scan job is executed, the electric power is not supplied to the printer unit 33. Therefore, the electric power to be used for the printer unit 33 is saved. Further, in case that the print job is executed, in the black-and-white printing, the amount of electric power to be consumed is low as compared with the color printing. In case that the temperature of the fixing portion 47 (See FIG. 5) is set to a low temperature, the amount of electric power to be consumed is low as compared with the case in which the temperature of the fixing portion 47 is set to a high temperature.

In this embodiment, the amount of electric power to be consumed in case that each unit of the image forming apparatus 10 operates in accordance with each of the setting contents, is previously registered in the nonvolatile memory 19. The CPU 11 estimates the amount of electric power by reading the contents registered in the nonvolatile memory 19. For example, in case that the print job for carrying out the black-and-white printing is executed, the CPU 11 reads the information relating to the amount of electric power to be consumed by the printer unit 33 when the black-and-white printing is carried out, the amount of electric power to be consumed by the storage unit 16 and the other amount of electric power to be consumed by the respective units when the print job is executed, from the contents registered in the nonvolatile memory 19, and sums up the above amount of electric power.

After the image forming apparatus 10 is started up without supplying the electric power to the storage unit 16, in case that the amount of electric power to be consumed by executing the job is less than the threshold value, the image forming apparatus 10 powers on the storage unit 16 when the job is executed. Therefore, the power consumption in the whole apparatus does not exceed the specified value and it is possible to prevent the increase in the number of times of rewriting data in the SSD 12.

Figure 6:
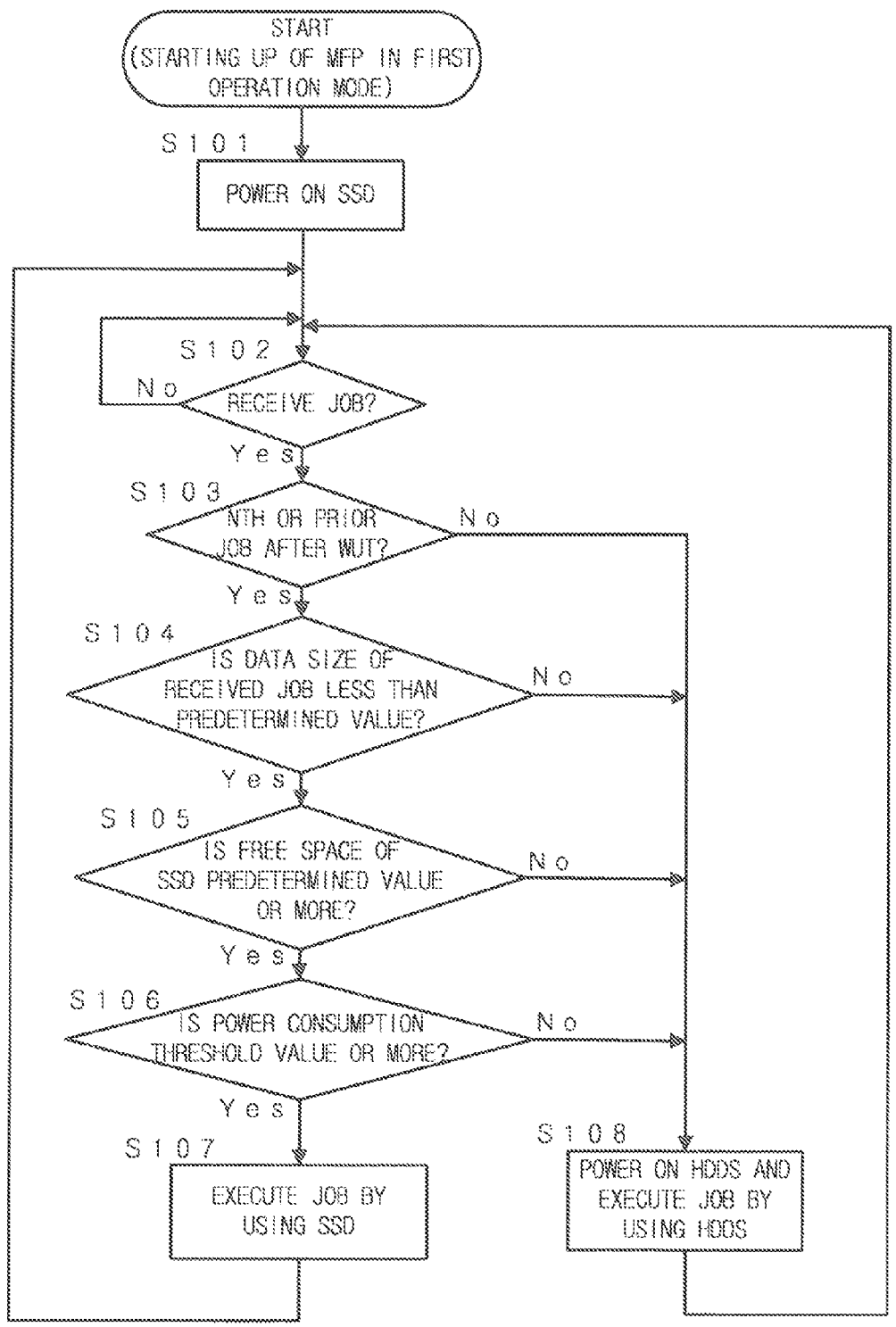
FIG. 6 is a flowchart showing the process in case that the image forming apparatus 10 is started up in accordance with the first operation mode and executes a job.

FIG. 6 shows the flowchart of the process in case that the image forming apparatus 10 is started up in accordance with the first operation mode and executes a job. Firstly, in the image forming apparatus 10, the SSD 12 is powered on without supplying the electric power to the storage unit 16. Then, the image forming apparatus 10 is started up by executing the programs stored in the SSD 12, and carries out the starting operation (Step S101).

The CPU 11 waits the reception of the job (Step S102; No). When the job is received (Step S102; Yes), the CPU 11 checks whether the received job is the Nth or prior job after the finish of the starting operation (referred to as "WUT" in this drawing) (Step S103). Step S103 corresponds to the judgment of the above-described Condition 1. Specifically, in case that the counter for counting the number of times of the execution of the jobs, which is counted up by the CPU 11, indicates the N or less, the CPU 11 judges that the received job is the Nth or prior job.

In case that the counter indicates N+1 or more, that is, in case that the received job is the (N+1)th or subsequent job (Step S103; No), the process proceeds to Step S108.

In case that the counter indicates N or less, that is, in case that the received job is the Nth or prior job (Step S103; Yes), the CPU 11 checks whether the data size of the received job is less than the predetermined value (Step S104). Step S104 corresponds to the judgment of the above-described Condition 2. In case that the data size is not less than the predetermined value (Step S104; No), the process proceeds to Step S108.

In case that the data size is less than the predetermined value (Step S104; Yes), the CPU 11 checks the free space of the SSD 12 (Step S105). Step S105 corresponds to the judgment of the above-described Condition 3. In case that the free space is less than the predetermined amount (Step S105; No) the process proceeds to Step S108.

in case that the free space is not less than the predetermined amount (Step S105; Yes), the CPU 11 estimates the amount of electric power to be consumed in the whole image forming apparatus 10 in case that the job is executed by using the storage unit 16 as the storing area for the image data. Then, the CPU 11 judges whether the estimated amount of electric power is not less than the threshold value (Step S106). Step S106 corresponds to the judgment of the above-described Condition 4. In case that the estimated amount of electric power is less than the threshold vale (Step S106; No), the process proceeds to Step S103. In case that the estimated amount of electric power is not less than the threshold value (Step S106; Yes), the CPU 11 executes the job by using the SSD 12 as the storing area for the image data (Step S107). Then, the process is continued by returning to Step S102.

In Step S108, the CPU 11 instructs the power control unit 23 to supply the electric power to the storage unit 16. When the electric power is supplied to the storage unit 16 (HDDs 1 to 3), the CPU 11 executes the job by using the storage unit 16 as the storing area for the image data. Then, the process is continued by returning to Step S102.

The process shown in FIG. 6 is repeatedly carried out until the image forming apparatus 10 is turned off. After the received job is executed by using the storage unit 16 as the storing area for the image data, in case that the next job is not received before the execution of the received job is finished, the power supply to the storage unit 16 may be immediately stopped. Alternatively, in case that the next job is not received before the predetermined waiting time elapses, the power supply to the storage unit 16 may be stopped. In case that the electric power is already supplied to the storage unit 16 in the second or later step S108, the step for instructing the power control unit 23 to supply the electric power to the storage unit 16 may be skipped.

As described above, in the image forming apparatus 10 according to the embodiment, the programs for the system control are stored in the SSD 12. Therefore, the image forming apparatus 10 can be started up and can be set to the state in which the job can be executed, without supplying the electric power to the storage unit 16. Then, in case that the job is executed by using the SSD 12 as the storing area for the image data, it is not necessary to supply the electric power to the storage unit 16 from the starting up of the image forming apparatus 10 until the execution of the job. Therefore, the power consumption can be saved.

That is, after the image forming apparatus 10 is started up without supplying the electric power to the storage unit 16, in case that all of the Conditions 1 to 4 are satisfied when the job is executed, the job is executed by using the SSD 12 as the storing area for the image data without supplying the electric power to the storage unit 16. Because the electric power is not supplied to the storage unit 16, the power consumption can be saved during the operation of the image forming apparatus 10. On the other hand, in case that at least any one of the Conditions 1 to 4 is not satisfied, the electric power is supplied to the storage unit 16 (HDDs) and the job is executed by using the storage unit 16 as the storing area for the image data. Therefore, it is possible to prevent the increase in the number of times of rewriting data in the SSD 12.

The electric power to be consumed by the SSD 12 is less than the electric power to be consumed by one HDD. In order to secure the data transfer speed in the HDDs, which is equivalent to or higher than the data transfer speed in the SDD 12, it is required to form the RAID0 by providing a plurality of HDDs. When the number of HDDs which are required to secure the necessary transfer speed is large, the power consumption which is caused by using the HDDs as the storing area for the image data is increased. Therefore, in case that the image forming apparatus 10 is controlled in accordance with the first operation mode, the effect that the power consumption is saved becomes high.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the storage unit 16 of the image forming apparatus 10 comprises three HDDs and the RAID0 is constituted by three HDDs. The number of HDDs provided in the image forming apparatus 10 or the number of HDDs constituting the RAID0 is not limited to the embodiment. For example, five or more HDDs may be provided in the image forming apparatus 10, and the five HDDs may constitute the RAID0.

In this embodiment, in the image forming apparatus 10, as the predetermined condition, all of the Conditions 1 to 4 are combined. The combination of the conditions is not limited to this. For example, only the Condition 1 may be adopted, or the combination of the Condition 2 and the Condition 3 may be adopted as the predetermined condition. Further, the predetermined condition is not limited to the conditions exemplified in the embodiment. For example, as the predetermined condition, it may be judged whether the job to be executed is a specific type of job.

In this embodiment, the image forming apparatus 10 comprises the HDDs and the SDD 12 as the storing devices. Other storing devices can be adopted. As long as two types of storing devices are different in the power consumption, the above two types of storing devices may be used in the image forming apparatus 10.

In this embodiment, the image forming apparatus 10 has two operation modes which are the first operation mode and the second operation mode, and one operation mode can be selected between the first operation mode and the second operation mode. However, the image forming apparatus may have only the first operation mode.

One of the objects of the above embodiment is to provide the image forming apparatus which uses the SSD in combination with the HDDs and which can save the power consumption during the operation.

In the above embodiment, because the image forming apparatus is started up by executing the program stored in the second storing device to which the electric power is supplied at the starting up of the image forming apparatus, the image forming apparatus can be started up without supplying the electric power to the first storing device. After the starting up, in case that the predetermined condition (the condition in which it is not required to use the first storing device as the storing area for the image data, or the like) is satisfied, the job is executed by using the second storing device in which the consumed power is low. In case that the predetermined condition is not satisfied, the electric power is supplied to the first storing device in which the consumed power is high, and the job is executed by using the first storing device. In case that the predetermined condition is satisfied, the job can be executed without supplying the electric power to the first storing device. Therefore, the power consumption can be saved during the operation of the image forming apparatus as compared with the case in which the predetermined condition is not satisfied.

In the above embodiment, after the image forming apparatus is started up without supplying the electric power to the first storing device, the image forming apparatus is controlled so as to execute the Nth (N is an integer which is 1 or more) or prior job by using the second storing device and so as to execute the (N+1)th or subsequent job by supplying the electric power to the first storing device and by using the first storing device. By preferentially using the second storing device in which the consumed power is low and by avoiding the electric power from being supplied to the first storing device in which the consumed power is high, as practicably as possible, it is possible to save the power consumption. For example, in case that the job execution is carried out N times or less after the starting up from the sleep state and the image forming apparatus 10 returns to the sleep state again, it is not at all required to use the first storing device. Further, because the (N+1)th or subsequent job is executed by using the first storing device, it is possible to suppress the number of times of using the second storing device.

In the above embodiment, after the image forming apparatus is started up without supplying the electric power to the first storing device, in case that the data size of the job is less than the predetermined value, the job is executed by using the second storing device. In case that the data size of the job is not less than the predetermined value, the electric power is supplied to the first storing device and the job is executed by using the first storing device. The second storing device in which the consumed power is low, is preferentially used. Further, in case that data size of the job is not less than the predetermined value, the electric power is supplied to the first storing device in which the consumed power is high. Therefore, the consumption power is saved, and it is possible to prevent the increase in the number of times of rewriting data in the second storing device. The information indicating the data size of the job is obtained before the execution of the job, and it is judged whether the first storing device is powered on in accordance with the obtained information.

In the above embodiment, after the image forming apparatus is started up without supplying the electric power to the first storing device, the job is executed by using the second storing device in case that the power consumption in the whole image forming apparatus, which is caused when the job is executed by using the first storing device, is not less than the threshold value. The job is executed by supplying the electric power to the first storing device and by using the first storing device in case that the above power consumption in the whole image forming apparatus is less than the threshold value. In case that the power consumption in the whole image forming apparatus does not exceed the specified value even though the first storing device is used, the first storing device is used by supplying the electric power to the first storing device. Therefore, the power consumption in the whole image forming apparatus does not exceed the specified value and it is possible to prevent the increase in the number of times of rewriting data in the second storing device.

In the above embodiment, after the image forming apparatus is started up without supplying the electric power to the first storing device, in case that the free space of the second storing device is not less than the predetermined amount, the job is executed by using the second storing device. In case that the free space of the second storing device is less than the predetermined amount, the job is executed by supplying the electric power to the first storing device and by using the first storing device. Because the electric power is supplied to the first storing device to use the first storing device in case that the free space of the second storing device is not more than the predetermined amount, it is possible to process the job having a large data size even though the free space of the second storing device becomes small.

In the above embodiment, the operation mode can be switched between the second operation mode in which the electric power is supplied to the first storing device at the starting up of the image forming apparatus, and the first operation mode in which the electric power is not supplied to the first storing device at the starting up. In case that a user wants to save the power consumption, the user can switch the operation mode to the first operation mode. In case that a user wants to preferentially use the first storing device, the user can switch the operation mode to the second operation mode. In the second operation mode, for example, the first storing device is preferentially used as the storing area for the image data.

In the above embodiment, the image forming apparatus is initially set so as to operate In the first operation mode. Therefore, in case that a specific instruction is not received after the image forming apparatus is shipped, the first operation mode has a priority over the second operation mode and the power consumption is saved.

In the above embodiment, the first storing device is HDDs and the second storing device is an SSD. The power consumption in the HDD is higher than the power consumption in the SSD. When the HDDs are used, in order to secure the data transfer speed which is equivalent to or higher than the data transfer speed in the SSD, it is required to use a plurality of HDDs (by the striping). As the number of HDDs becomes large, the effect that the power consumption is saved becomes high.

According to the above image forming apparatus, it is possible to save the power consumption during the operation of the image forming apparatus by using the SSD in combination with the HDDs.

The present U.S. patent application claims the priority of Japanese Patent Application No. 2013-80553, filed on Apr. 8, 2013, according to the Paris Convention, and the entirety of which is incorporated herein by reference for correction of incorrect translation.

What is claimed is:

1. An image forming apparatus, comprising:
   an image forming unit configured to form an image in accordance with image data;
   a first storing device;
   a second storing device in which consumed power is low as compared with the first storing device;
   an obtaining unit configured to obtain a job; and
   a control unit configured to start up the image forming apparatus by executing a program stored in the second storing device, to control an execution of the job obtained by the obtaining unit, which is carried out by using the first storing device or the second storing device as a storing area for the image data, and to control a power supply to each unit of the image forming apparatus,
   wherein the control unit controls the image forming apparatus in a first operation mode in which the image forming apparatus is started up without supplying electric power to the first storing device, and in which in case that a predetermined condition is satisfied, the job is executed by using the second storing device and in case that the predetermined condition is not satisfied, the job is executed by supplying the electric power to the first storing device and by using the first storing device.

2. The image forming apparatus of claim 1, wherein the predetermined condition is that the obtained job is Nth or prior job after the image forming apparatus is started up, N being an integer which is 1 or more.

3. The image forming apparatus of claim 1, wherein the obtaining unit obtains information indicating data size of the job, and the predetermined condition is that the data size which is indicated by the obtained information is less than a predetermined value.

4. The image forming apparatus of claim 1, wherein the predetermined condition is that power consumption in whole of the image forming apparatus, which is caused when the job is executed by using the first storing device, is not less than a threshold value.

5. The image forming apparatus of claim 1, wherein the predetermined condition is that a free space of the second storing device is not less than a predetermined amount.

6. The image forming apparatus of claim 1, wherein the control unit controls the image forming apparatus in the first operation mode or in a second operation mode in which the electric power is supplied to the first storing device when the image forming apparatus is started up.

7. The image forming apparatus of claim 6, wherein the image forming apparatus is initially set so as to operate in the first operation mode.

8. The image forming apparatus of claim 1, wherein the first storing device is HDDs, and the second storing device is an SSD.

* * * * *